(No Model.) 2 Sheets—Sheet 1.
G. E. HOPKIN.
RIVETING MACHINE.
No. 469,143. Patented Feb. 16, 1892.
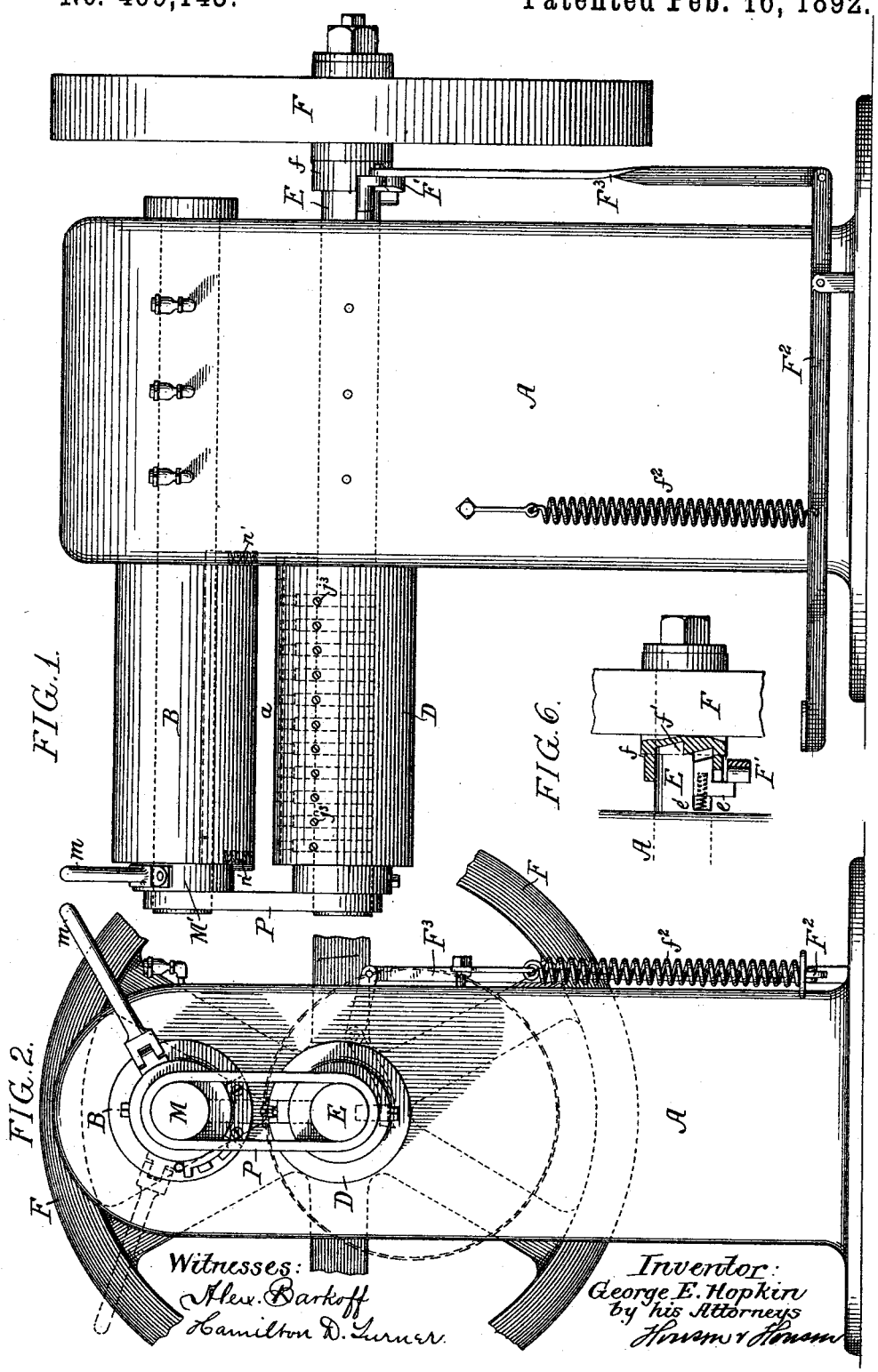

(No Model.) 2 Sheets—Sheet 2.
G. E. HOPKIN.
RIVETING MACHINE.
No. 469,143. Patented Feb. 16, 1892.
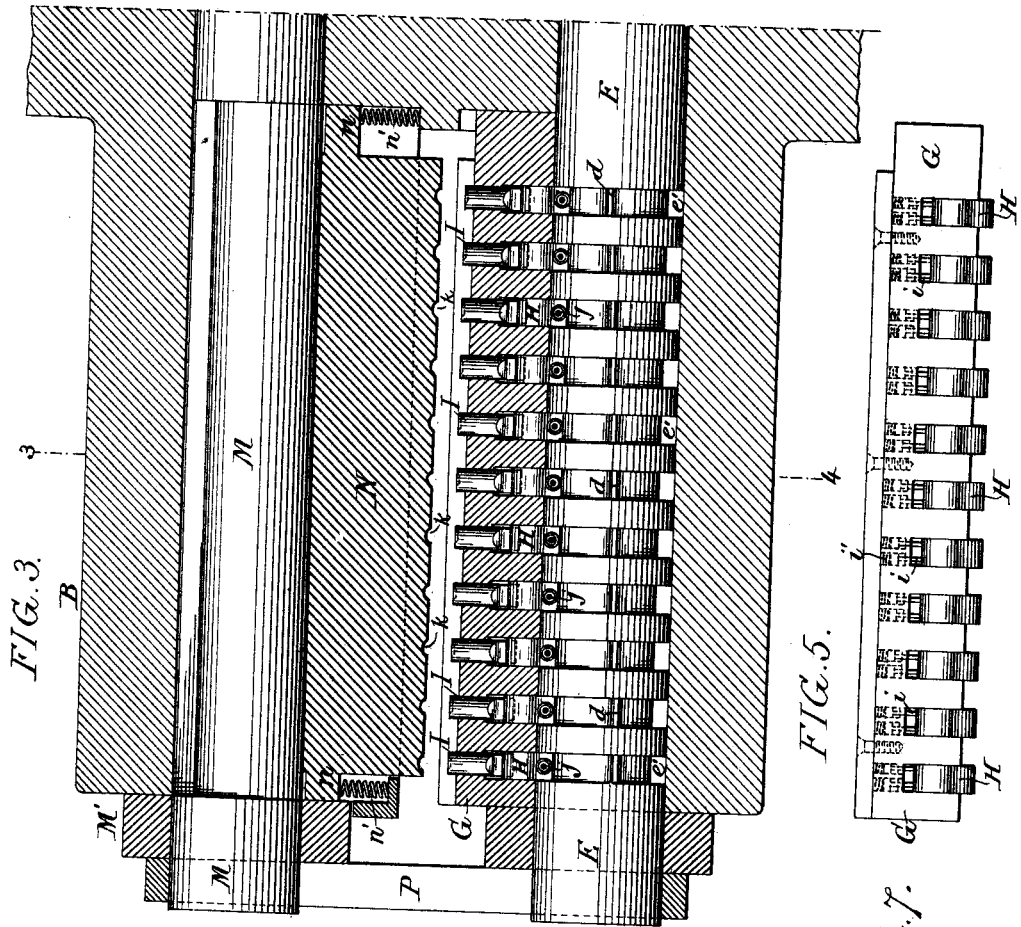
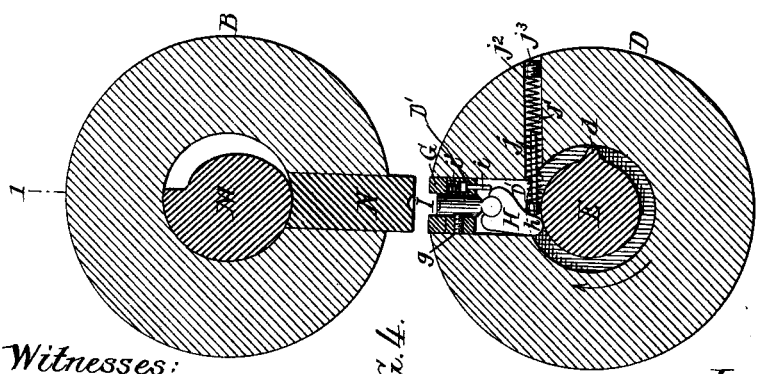
Witnesses:
Alex. Barkoff
Hamilton D. Turner
Inventor:
George E. Hopkin
by his Attorneys
Hinom & Hinom

UNITED STATES PATENT OFFICE.

GEORGE E. HOPKIN, OF PHILADELPHIA, PENNSYLVANIA.

RIVETING-MACHINE.

SPECIFICATION forming part of Letters Patent No. 469,143, dated February 16, 1892.

Application filed November 19, 1890. Serial No. 371,979. (No model.)

*To all whom it may concern:*

Be it known that I, GEORGE E. HOPKIN, a citizen of the United States, and a resident of Philadelphia, Pennsylvania, have invented certain Improvements in Riveting-Machines, of which the following is a specification.

The object of my invention is to construct a machine for riveting sheet-metal plates, boiler-sections, and the like by one operation. This object I attain in the following manner, reference being had to the accompanying drawings, in which—

Figure 1 is a side view of my improved riveting-machine. Fig. 2 is an end view. Fig. 3 is an enlarged section on the line 1 2, Fig. 4. Fig. 4 is a section on the line 3 4, Fig. 3. Fig. 5 is a detached view showing the die-carrier. Fig. 6 is a sectional view of the clutching mechanism, and Fig. 7 is an enlarged sectional view illustrating the action of the machine.

My invention is especially applicable for use in riveting the sheet-metal drums used in heaters and boilers, dispensing with the usual hand process, the two ends of the plate forming a drum having a series of rivet-holes punched in them near their edges, and when bent to the position, shown by dotted lines in Fig. 2, so that one edge overlaps the other, the rivets are placed in the holes, and with one turn of the fly-wheel these rivets are flattened and the drum thus formed firmly and quickly riveted together.

I will now describe the machine, reference being had to the accompanying drawings.

A is the main body of the machine, having two arms B and D. The space $a$ between these two arms is of sufficient width to admit the sheet to be riveted and the rivets. The riveting-dies are carried by the arm D, and the clamp for the metal carried by the arm B.

E is the power-driven shaft extending through the arm D, and on one end of this shaft is loosely hung the fly-wheel F, which in the present instance is also the belt-wheel. This wheel F can be thrown into gear with the shaft E by the clutching mechanism shown clearly in Figs. 1 and 6. The hub $f$ of the wheel F is provided with teeth $f'$, as shown in Fig. 6, and the shaft E is grooved for the reception of a sliding pin $e$, adapted to engage with the teeth $f'$, and acted upon by a spring $e'$, tending to force the pin into engagement with the teeth of the hub. F' is a lever pivoted to the frame of the machine and having an inclined face normally engaging with the shank of the pin $e$ and holding said pin out of engagement with the teeth $f'$; but when it is desired to start the machine the treadle $F^2$, which is connected to the lever F' by a rod $F^3$, is depressed, and the spring $e'$ is free to act and throw the pin $e$ into engagement with the teeth and start the machine. When the treadle is released, a spring $f^2$ returns it to its normal position, and the lever F', engaging with the pin $e$, draws the latter out of engagement with the teeth $f'$ and stops the machine.

In the shaft E is a series of annular grooves $e'$, and formed on the reduced portion of the shaft in each of these grooves is a projecting cam-lug $d$. These cam-lugs are not on the same longitudinal line, but they range one slightly in advance of the other, so that the strain in riveting will be divided, as will be readily understood on reference to the drawings.

Adapted to a slot D' in the upper portion of the arm D is a die-carrier G, in which is a series of dies I, having depressions in their faces to conform to the shape of the head of the finished rivet. The opposite end of each die is in the form of a cylinder, and adapted to this portion is a toggle-block H, having an extension $h$ resting in the path of the lug $d$ on the shaft E, so that as the shaft revolves the lug will strike the toggle-block H and force the riveting-die up, compressing the rivets. On the upper edge of the die-carrier are two bars situated on each side of the dies, so as to guide the tail ends of the rivets when the drum to be riveted is placed in position. The side of the die I is grooved, and in this groove rests the end of a screw $g$ in order to keep the die from turning. At the side of each die are two small bolts $i$, backed by springs $i'$, which rest upon the upper edge of the toggle-block H and force the die down after it has compressed the rivet. A spring-bolt $j$, adapted to an orifice $j'$ in the arm D, is arranged opposite each toggle-block and rests against the side opposite to that struck by the cam-lug $d$. The bolt is backed by a spring $j^2$, the strength of which can be adjusted by the screw-plug $j^3$, so that it will be seen that after the cam-lug moves the toggle-block forward and raises the die the two springs act to draw the die down and force the block to its normal position.

Carried by the upper arm B is a cam-shaft M, to which is secured a sleeve M', having a handle $m$ pivoted thereto. The form of the cam is clearly shown in Fig. 4 and acts on a clamp-bar N, adapted to slide vertically in a slot in the arm B. Lugs $n$ $n$ project from each end of the bar N, and between these lugs and a bearing on the fixed portion of the machine are springs $n'$, which return the clamp-bar to its normal position after it is freed from the control of the cam M. The clamp-bar has a series of depressions $k$ in its face to hold the rivets in a vertical line and to keep the heads to the proper form.

In order to prevent any spreading strain on the two arms, a link P passes around the end of the cam-shaft M and the end of the shaft E, holding them rigidly while the machine is acting.

The operation is as follows: The drum to be riveted, for instance, is bent to the form shown in Fig. 2, and by preference the two end rivets are riveted by hand in order to allow for the ready manipulation of the drum. The drum is then placed over the arm D and the series of rivets are placed in the rivet-holes, the number of rivets depending upon the width of the sheet to be riveted, the character of the material, and the use to which it is put. After the rivets have been inserted in the drum the drum is so placed as to bring the rivets above their respective dies, after which the clamp-bar is forced down upon the plate by turning the handle to the position shown by dotted lines in Fig. 2. The link, however, in the first instance, is placed over the ends of the two shafts. The clutch is then tripped by forcing the treadle down, allowing the shaft E to turn one complete revolution, forcing all the toggle-blocks forward and lifting the dies which compress and shape the rivets. The clutch is thrown out automatically after this operation, so that the shaft, as before mentioned, will only turn one revolution at each depression of the treadle.

As mentioned in the fore part of this specification, the cam-lugs $d$ are placed one slightly in advance of the other, so that the compression strain is divided, only two or three riveting-dies acting at the same time.

I claim as my invention—

1. The combination, in a riveting-machine, of the frame A, having two parallel arms B and D, a movable clamp-bar guided in the arm B, a rotatable cam-shaft $m$, situated in said arm and acting to depress said clamp-bar, a series of riveting-dies carried by the arm D, a toggle-block for each die, a cam-shaft, a series of cams thereon for acting on said toggle-blocks, springs for withdrawing the same, and means for clutching and releasing said shaft, substantially as specified.

2. The combination, in a riveting-machine, of the frame, a shaft E, a clutch thereon for throwing the shaft into gear with the driving mechanism, a die-carrier in said frame, a series of dies carried thereby, toggle-blocks secured to said dies, cam-lugs on said shaft E, acting on the toggle-blocks, and springs tending to depress the dies and to move the toggle-blocks to their normal position, substantially as set forth.

3. The combination of the frame A, having arms B and D, die-carriers in the arm D, dies therein, toggle-blocks on said dies, a shaft having cams adapted to act upon said toggle-blocks, a cam-shaft M, carried by the arm B, and a clamp-bar situated above the dies and in a position to be acted upon by the cam-shaft M, substantially as described.

4. The combination of the dies, means for operating the same, with a clamp-bar above said dies, a cam-shaft acting upon said bar, with a sleeve on said cam-shaft, a handle on said sleeve by which said cam-shaft is operated, and a cam to move said clamp-bar and clamp the plate to be riveted, substantially as set forth.

5. The combination, in a riveting-machine, of the frame A, having two arms B and D, a series of riveting-dies carried by the arm D, a power-driven shaft acting upon said dies, a clamp-bar carried by the arm B, and a cam-shaft for acting upon said bar, with a link passing over the ends of the said shafts, holding said shafts in their relative positions, substantially as set forth.

In testimony whereof I have signed my name to this specification in the presence of two subscribing witnesses.

GEORGE E. HOPKIN.

Witnesses:
HENRY HOWSEN,
HARRY SMITH.

It is hereby certified that Letters Patent No. 469,143, granted February 16, 1892, upon the application of George E. Hopkin, of Philadelphia, Pennsylvania, for an improvement in "Riveting-Machines," was erroneously issued to the said Hopkin as owner of said invention; that said Letters Patent should have been issued to *the Abram Cox Stove Company, of same place*, said Abram Cox Stove Company being assignee of the entire interest in said invention as shown by the assignments of record in this Office; and that said Letters Patent should be read with this correction therein that the same may conform to the record of the case in the Patent Office.

Signed, countersigned, and sealed this 23d day of February, A. D. 1892.

[SEAL.] CYRUS BUSSEY,
*Assistant Secretary of the Interior.*

Countersigned:
W. E. SIMONDS,
*Commissioner of Patents.*